(12) United States Patent
Wertheimer et al.

(10) Patent No.: US 8,201,005 B2
(45) Date of Patent: Jun. 12, 2012

(54) NEGOTIATING A TRANSMIT WAKE TIME

(75) Inventors: Aviad Wertheimer, Tsur Hadassah (IL); Robert Hays, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 12/381,811

(22) Filed: Mar. 17, 2009

(65) Prior Publication Data

US 2010/0241880 A1 Sep. 23, 2010

(51) Int. Cl.
*G06F 1/32* (2006.01)

(52) U.S. Cl. ......... 713/323; 709/220; 370/311; 370/431

(58) Field of Classification Search .................. 713/323; 709/220; 370/311, 431
See application file for complete search history.

(56) References Cited

U.S. PATENT DOCUMENTS

| | | | | |
|---|---|---|---|---|
| 7,356,561 B2* | 4/2008 | Balachandran et al. | ...... | 709/203 |
| 7,564,812 B1* | 7/2009 | Elliott | .......................... | 370/329 |
| 7,925,908 B2* | 4/2011 | Kim | ............................... | 713/320 |
| 2004/0128387 A1* | 7/2004 | Chin et al. | .................... | 709/227 |
| 2006/0253735 A1* | 11/2006 | Kwak et al. | ...................... | 714/12 |

OTHER PUBLICATIONS

Sedarat, Hossein, "10GBase-T EEE Specifications", Refresh, Quiet, Aquantia, Sep. 2008, pp. 1-14.
Sedarat, Hossein, "Refresh an Option to Ease 10gbase-T LPI Parameter Selection", Aquantia, Sep. 2008, pp. 1-9.
Taich et al., "Enhancements to the Low-PowerIdle Mode", 802.3az Plenary Meeting, Mar. 12, 2008, pp. 1-14.
Taich et al., "10GBASE-T Low-Power Idle Proposal", 802.3az Plenary Meeting, May 7, 2008, pp. 1-21.
Taich et al., "Alert Signal Proposal for 10GBASE-T EEE", Energy Efficient Ethernet (802.3az), Seoul, Korea, Sep., 2007, pp. 1-7.
Taich, Dimitry,"Additional Test Modes Definition for 10GBASE-T LPI", Energy Efficient Ethernet (802.3az), Dallas, TX, Nov. 4, 2008, pp. 1-9.
Taich et al., "Alert Signal Proposal for 10GBASE-T EEE", Energy Efficient Ethernet (802.3az), Seoul, Korea, Sep. 13, 2008, pp. 1-8.
Taich, Dimitry, "Annex of the 10GBASE-T EEE Alert Signal Proposal", Energy Efficient Ethernet (802.3az), Seoul, Korea, Sep. 13, 2008, pp. 1-4.
Telang et al., "A "Subset Phy Subset Phy"Approach for 10GBASE-KR Energy Efficient Ethernet", IEEE 802.3az, Orlando, Florida, Mar. 2008, 16 pages.
Tellado et al., "Alert signal Comments for 10GBASE-T EEE", Energy Efficient Ethernet (802.3az), Dallas, US, Nov. 2008, pp. 1-9.
Thompson, Geoff, "Another View of Low Power Idle / Idle Toggle", Version 0.2, Orlando, Mar. 2008, pp. 1-14.
Thompson, Geoff, "Another Piece of EEE", An additional requirement for Energy Efficient Ethernet, Atlanta, Nov. 2007, 7 pages.
Tidstrom, Rick, "IEEE P802.3az D1.0 Clause 55 State Diagrams updated", Broadcom, IEEE 802.3az Task Force, Nov. 2008, pp. 1-17.
Traber, Mario, "Low-Power Idle for 1000bT", IEEE P802.3az Eee Task-Force, Plenary Meeting, Mar. 2008, pp. 1-21.
Traber, Mario, "The European COC", IEEE P802.3az Eee Task-Force, Plenary Meeting, Mar. 2008, pp. 1-11.
Walewski, "EEE for Real-Time Industrial Ethernet (?)", IEEE 802 plenary meeting, Vancouver, BC, Mar. 10, 2009, pp. 1-15.

(Continued)

*Primary Examiner* — Thuan Du

(57) ABSTRACT

Includes receiving, from a link partner, a message specifying a link partner receive wake time and resolving to the lesser of the received link partner receive wake time and a local transmit wake time.

22 Claims, 11 Drawing Sheets

OTHER PUBLICATIONS

Wertheimer, Aviad, "Negotiation Proposal for LPI EEE", IEEE 802.3az Task Force, Mar. 2008, pp. 1-10.
Woodruff et al., "10GBASE-T Eee Proposal xLPI", Aquantia, pp. 1-11.
Zimmerman, "10GBase 10GBase-T Active / Low Low-Power Idle Toggling", Energy Efficient Ethernet, Mar. 2008, pp. 1-15.
Zimmerman et al., "10GBase-T Active / Low Low-Power Idle Toggling with Sense Interval", Energy Efficient Ethernet, Mar. 2008, pp. 1-2.
Zimmerman et al., "Deep Sleep Idle Concept for PHYs", Energy Efficient Ethernet, Solarflare Communication, Nov. 6, 2007, pp. 1-14.
Barrass, Hugh, "EEE control protocol proposal", IEEE 802.3az EEE Task Force, Atlanta, Georgia, Nov. 2007, pp. 1-11.
Barrass, Hugh, "EEE Exchange of Management Information", IEEE 802.3az EEE Task Force, Vancouver, British Columbia, Mar. 2009, pp. 1-11.
Baumer et al., "A "Subset PHY" Approach for 10GBASE-KR Energy Efficient Ethernet", IEEE 802.3az, Portland, Oregon, Jan. 2008, pp. 1-7.
Bennett, Mike, "Energy Efficient Ethernet and 802.1", IEEE 802.3az Energy Efficient Ethernet Task Force, Feb. 15, 2008, pp. 1-9.
Bennett, Mike, "IEEE 802.3az Energy Efficient Ethernet", Open Questions for the Task Force, IEEE Plenary Meeting, Atlanta, GA, Nov. 2007, pp. 1-13.
Bennett, Mike, "IEEE 802.3az Energy Efficient Ethernet", Task Force Update, Presented to the P802.3ba Task Force, IEEE Plenary Meeting, Denver, CO, Jul. 16, 2008, pp. 1-17.
Booth, Brad, "Supporting Legacy Devices", AMCC, IEEE 802.3az Interim Meeting, Jan. 2008, 10 pages.
Booth, Brad, "Backplane Ethernet Low-Power Idle", AMCC, May 2008, 14 pages.
Chadha, Mandeep, "Transmit Amplitude Reduction "Green-T: The path to a "greener" 10BASE-T, IEEE 802.3az Interim Meeting, Jan. 2008, pp. 1-11.
Chadha, Mandeep, "Cat5 Twisted Pair Model for "Green" 10BASE-T", IEEE 802.3az Interim Meeting, Jan. 2008, pp. 1-22.
Chadha, Mandeep, "Re-optimization of CatS Twisted Pair Model for 10BASE-Te", IEEE 802.3az Interim Meeting, Sep. 2008, pp. 1-28.
Chou, Joseph, "Proposal of Low-Power Idle 100Base-Tx", IEEE 802.3az Task Force Interim Meeting, Jan. 2008, pp. 1-26.
Chou, Joseph, "Response to comments on Clause 24 of Draft 1p1", IEEE 802.3az Task Force Interim Meeting, Jan. 2009, pp. 1-8.
Chou, Joseph, "Low-Power Idle based Eee 100Base-TX", IEEE 802.3az Task Force Interim Meeting, Mar. 2008, pp. 1-18.
Chou, Joseph, "EEE Compatible 100Base-TX", IEEE 802.3az Task Force Interim Meeting, May 2008, pp. 1-25.
Chou, Joseph, "Corner cases and Comments on EEE Clause 40", IEEE 802.3az Task Force Interim Meeting, Sep. 2008, pp. 1-18.
Chou, Joseph, "Making EEE GPHY more robust on corner cases", IEEE 802.3az Task Force Plenary Meeting, Nov. 2008, pp. 1-14.
Chou, Joseph, "Feasibility of Asymmetrical Low-Power Idle 1000Base-T", IEEE 802.3az Task Force Interim Meeting, Jan. 2008, pp. 1-14.
Chou, Joseph, "A pathway to Asymmetric EEE GPHY", IEEE 802.3az Task Force Plenary Meeting, Mar. 2008, pp. 1-23.
Chou, Joseph, "EEE Compatible MII/GMII Interface", IEEE 802.3az Task Force Interim Meeting, May 2008, pp. 1-16.
Chou, Joseph, "Timing Parameters of LPI 100BASE-TX", IEEE 802.3az Task Force Plenary Meeting, Jul. 2008, pp. 1-14.
Frazier et al., "Technical Open Items for LPI", IEEE 802.3az, Orlando, FL, Mar. 2008, pp. 1-9.
Diab, Wael W., "802.3az Task Force Layer 2 Ad-Hoc Report", IEEE 802.3az Layer 2 Ad-Hoc Report on Plenary Meeting, Mar. 10, 2009, pp. 1-13.
Diab, Wael W., "Discussion with 802.1 Regarding 802.3at/802.3az use of LLDP", IEEE 802.3 Joint Discussion with 802.1, Denver, Jul. 2008, pp. 1-15.
Carlson et al., "802.3az Jan. 09 Interim: LLDP's Use in EEE", IEEE P802.3az EEE, Jan. 2009, pp. 1-31.
Dietz, Bryan, "802.3az D1.1 Clause 22.2.1 Transmit Deferral during LPI",802.3az Interim Meeting, Jan. 6, 2009, pp. 1-6.
Diminico, Chris, "Physical Layer Considerations for Link Speed Transitions", EEE Study Group, pp. 1-8.
Dove, Dan, "Energy Efficient Ethernet Switching Perspective", IEEE 802.3az Interim Meeting, Jan. 2008, pp. 1-14.
Dove, Dan, "Energy Efficient Ethernet Switching Perspective", IEEE 802.3az Interim Meeting, May 2008, pp. 1-19.
Dove, Dan, "Energy Efficient Ethernet xxMll Clarifications", IEEE 802.3az Interim Meeting, May 2008, pp. 1-7.
Diab, Wael W., "Energy Efficient Ethernet and 802.1", IEEE 802 Plenary, Atlanta, GA, Nov. 16, 2007, 23 pages.
Wang et al., "IEEE P802.3az/D1.1 Clause 24 Receive State Diagram Corner Case Analysis", IEEE P802.3az Task Force, New Orleans, Jan. 2009, pp. 1-6.
Grimwood et al., "LPI Synchronization Feasibility Questions", IEEE P802.3az Task Force, Orlando, FL, Mar. 2008, pp. 1-12.
Grimwood, Mike, "Energy Efficient Ethernet 1000 BASE-T LPI Wait-Quiet Timer", IEEE P802.3az Task Force, Seoul, Sep. 2008, pp. 1-6.
Lin et al., "IEEE P802.3az/D1.1 Clause 40 PHY Control State Diagram Corner Case Analysis", IEEE P802.3az Task Force, New Orleans, Jan. 2009, pp. 1-9.
Grimwood et al., "Energy Efficient Ethernet 1000BASE-T LPI Timing Parameters Update", IEEE P802.3az Task Force, Denver, CO, Jul. 2008, pp. 1-9.
Grimwood et al., "IEEE P802.3az/D1.0 Clause 40 Ipi_mode Encoding", IEEE P802.3az Task Force, Dallas, Nov. 2008, pp. 1-12.
Grimwood et al., "IEEE P802.3az/D1.0 Clause 55 PHY Wake Time Updated", IEEE P802.3az Task Force, Dallas, Nov. 2008, pp. 1-6.
Hays, Robert, "Terminology Proposal for LPI EEE", IEEE 802.3az Task Force, Orlando, FL, Mar. 2008, pp. 1-8.
Wertheimer et al., "Capabilities Negotiation Proposal for Energy-Efficient Ethernet", IEEE 802.3az, Munich, May 2008, pp. 1-18.
Hays, Robert, "Active/Idle Toggling with 0BASE-x for Energy Efficient Ethernet", IEEE 802.3az Task Force, Nov. 2007, pp. 1-22.
Hays, Robert, "EEE Capabilities Negotiation Proposal Revision 2", IEEE 802.3az Task Force, May 2008, pp. 1-13.
Minutes of meeting, 802.3az Energy Efficient Ethernet (EEE) Task Force and 802.1 Data Center Bridging (DCB) Task Group Joint meeting, Wednesday, Mar. 19, 2008, 5 pages.
Parnaby et al., "10GBase-T Active / Low-Power Idle Toggling", Energy Efficient Ethernet, Jan. 2008, pp. 1-14.
Teener, Michael D., "Joint ITU-T/IEEE Workshop on Carrier-class Ethernet", AudioNideo Bridging for Home Networks, IEEE 802.1 AV Bridging Task Group, Geneva, May 31-Jun. 1, 2007, 35 pages.
Healey, Adam, "1000BASE-T Low-Power Idle", IEEE P802.3az Task Force Meeting, Jan. 2008, pp. 1-14.
Healey, Adam, "1000BASE-T Low-Power Idle update", IEEE P802.3az Task Force Meeting, Orlando, FL, Mar. 18, 2008, pp. 1-13.
Healey, Adam, "1000BASE-T Low-Power Idle", IEEE P802.3az Task Force Meeting, Munich, Germany, May 13, 2008, pp. 1-22.
Fitzgerald, Niall, "1000BASE-T PHY Control State Diagram Modifications", IEEE P802.3az Task Force Meeting, New Orleans, LA, Jan. 2009, pp. 1-25.
Healey, Adam, "Proposed Modifications to IEEE 802.3az/D0.9 Clause 40", IEEE P802.3az Task Force Meeting, Seoul, KR, Sep. 2008, pp. 1-11.
Healey, Adam, "Observations regarding Energy Efficient 1000BASE-KX", IEEE P802.3az Task Force Meeting, Dallas, TX, Nov. 2008, pp. 1-13.
Healey, Adam, "PHY timers for 1000BASE-T Energy Efficient Ethernet", IEEE P802.3az Task Force Meeting, Vancouver, BC, Mar. 11, 2009, pp. 1-13.
Healey, Adam, "Supporting material related to comments against Clause 40", IEEE P802.3az Task Force Meeting, Dallas, TX, Nov. 11, 2008, pp. 1-29.
"Broad Market Potential", IEEE interim meeting, Geneva, CH, May 2007, pp. 1-5.
"Energy Efficient Ethernet Call Call-For For-Interest Summary and Motion", IEEE 802.3 Working Group, Dallas, TX, Nov. 16, 2006, pp. 1-8.

Bennett, Mike, "IEEE 802.3 Energy Efficient Ethernet Study Group", Agenda and general information, Monterey, CA, Jan. 2007, pp. 1-25.
Bennett, Mike, "IEEE 802.3 Energy Efficient Ethernet Study Group", Agenda and general information, Orlando, FL, Mar. 2007, pp. 1-26.
Bennett, Mike, "IEEE 802.3 Energy Efficient Ethernet Study Group", Agenda and general information, Ottawa, ON, Apr. 2007, pp. 1-27.
Bennett, Mike, "IEEE 802.3 Energy Efficient Ethernet Study Group", Agenda and general information, Geneva, Switzerland, May, 2007, pp. 1-31.
"IEEE Energy Efficient Ethernet Study Group", Unapproved Minutes, Ottawa, ON, Canada, Apr. 17-18, 2007, 5 pages.
Barrass, Hugh, "Energy Efficient Ethernet Objectives & 5 Criteria", A strawman to spur discussion and drive towards consensus, IEEE 802.3 Energy Efficient Ethernet, Monterey, CA, Jan. 2007, pp. 1-12.
Barrass, Hugh, "Energy Efficient Ethernet Setting the bar", A system developer's view of new PHY proposals, IEEE 802.3 Energy Efficient Ethernet, Orlando, Florida, Mar. 2007, pp. 1-7.
Barrass, Hugh, "Energy Efficient Ethernet Beyond the PHY", Power savings in networked systems, IEEE 802.3 Energy Efficient Ethernet, Geneva, Switzerland, May 2007, pp. 1-12.
Barrass, Hugh, "Energy Efficient Ethernet Transparent—not invisible", Some important considerations for management of EEE, IEEE 802.3 Energy Efficient Ethernet, San Francisco, Jul. 2007, pp. 1-8.
Bennett, Mike, "IEEE 802.3 Energy Efficient Ethernet Study Group", Server Bandwidth Utilization plots, Orlando, FL, Mar. 2007, pp. 1-13.
Booth, Brad, "802.3 Standards Development Lessons Learned", AMCC, Jan. 2007, pp. 1-19.
Chadha et al., "Feasibility of 1000-Base-T RPS Restart", Vitesse, IEEE 802.3 EEE SG, Interim Meeting, Apr. 2007, pp. 1-9.
Chadha et al., "10BT Amplitude Optimization", Vitesse, IEEE 802.3 EEE SG, Interim Meeting, Apr. 2007, pp. 1-5.
Chalupsky et al., "A Brief Tutorial on Power Management in Computer Systems", Intel Corporation, Mar. 11, 2007, pp. 1-28.
Christensen, Ken, "Rapid PHY Selection (RPS): A Performance Evaluation of Control Policies Policies", IEEE 802.3 EEE Study Group, Monterey, CA, Jan. 15, 2007, pp. 1-45.
Christensen, Ken, "Rapid PHY Selection (RPS): Emulation and Experiments using Pause", IEEE 802.3 EEE Study Group, Orlando, FL, Mar. 13, 2007, pp. 1-16.
Carlson et al., "Energy Efficient Ethernet Another Look at the Objectives", IEEE 802.3 EEE SG, Geneva, Switzerland, May 2007, pp. 1-6.
Diab et al., "Subset PHY: Cost and Power Analysis", IEEE 802.3 EEESG, Broadcom, Seoul, South Korea, Sep. 2007, pp. 1-10.
"Project Authorization Request (PAR) Process", May 31, 2007, IEEE standard information technology, 3 pages, Available at: https://development.standards.ieee.org/cgi-bin/NesCOM/myP_par?prt_pview.
"Energy Efficient Ethernet Call Call-For For-Interest", IEEE 802.3 Working Group, Dallas, TX, Nov. 14, 2006, pp. 1-43.
"Energy Efficient Ethernet Study Group Meeting Minutes", May 29, 2007, 12 pages.
"Energy Efficient Ethernet Study Group Meeting Minutes", Jul. 17, 2007, 7 pages.
"Energy Efficient Ethernet Study Group Meeting Minutes", Sep. 11, 2007, 5 pages.
Frazier, Howard, "Review of the 5 Criteria", IEEE 802.3 Eeesg, Jan. 2007, 29 pages.
Frazier et al., "EEE transition time constraints", IEEE 802.3 EEE SG, Geneva, CH, May 29, 2007, pp. 1-9.
Ganga et al., "End-Stations System Requirements and a proposal for EEE Objectives", IEEE 802.3 EEE 4 SG presentation for Mar. 2007 Plenary, Mar. 9, 2007, pp. 1-12.
Grow, Bob, "802.1 and Energy Efficient Ethernet", IEEE 802.3 EEESG Interim, Seoul, Korea, Sep. 11, 2007, pp. 1-6.
Haran, Onn, "Applicability of EEE to fiber PHYs", IEEE 802.3 EEE meeting, Seoul, Korea, Sep. 2007, pp. 1-12.
Koenen, David, "EEE for Backplane PHYs in Blade Server Environment", IEEE 802.3 EEE SG, Mar. 2007, pp. 1-8.
Koenen, David, "Potential Ethernet Controller Power Savings", EEE, Geneva, May 2007, pp. 1-5.
"10GBASE-T Power Budget Summary", Tehuti Networks, Mar. 2007, pp. 1-3.
Law et al., "Scope components for Rapid PHY selection", 2 pages.
Law, David, "Transmit disable time in a packet based speed change protocol Impact on objectives", IEEE 802.3 EEE SG Interim Meeting, May 2007, pp. 1-8.
Law, David, "Packet loss in protocol based speed change", IEEE 802.3 EEE SG Interim Meeting, Sep. 2007, pp. 1-12.
Holt et al., "Observations and Thoughts on Rate Switching", Mar. 31, 2007, pp. 1-8.
"IEEE Energy Efficient Ethernet Study Group", Unapproved Minutes, Orlando, FL, Mar. 13-15, 2006, 10 pages.
Nordman, Bruce, "Energy Efficient Ethernet: Outstanding Questions", IEEE 802 interim meeting, Monterey, California, Jan. 15-16, 2007, pp. 1-10.
Nordman, Bruce, "Energy Efficient Ethernet: Outstanding Questions-Update: Mar. 2007", IEEE 802 interim meeting, Orlando, Florida, Mar. 13-15, 2007, pp. 1-5.
Nordman, Bruce, "EEE Savings Estimates", IEEE 802 Plenary Meeting, San Francisco, Jul. 18, 2007, 9 pages.
Nordman, Bruce, "EEE Savings Estimates", May 25, 2007, pp. 1-11.
Nordman, Bruce, "Energy Efficient Ethernet: Outstanding Questions", Mar. 12, 2007, 3 pages.
Nordman, Bruce, "Energy Efficient Ethernet: Outstanding Questions", Mar. 19, 2007, 3 pages.
Paxson, Vern, "Some Perspectives on the Performance Impact of Link-Speed Switching Outages", Jul. 18, 2007, 10 pages.
Powell et al., "Technical Considerations and Possible Solution Sets for EEE", IEEE 802.3 Energy Efficient Ethernet Study Group Interim Meeting, Broadcom, May 2007, pp. 1-7.
Thompson, Geoff, "0 Base-T Possibilities", Presented to Energy Efficient Ethernet Study Group, Jul. 2007, 10 pages.
Woodruff, "10GEEE—Time to Switch", Mar. 2007, pp. 1-8.
Woodruff et al., "Efficiency and EEE-Technical Feasibility", May 29, 2007, pp. 1-15.
Zimmerman, George, "Considerations for Technical Feasibility of EEE with 10GBASE 10GBASE-T", Mar. 7, 2007, pp. 1-10.
Zimmerman et al., "Update on Technical Feasibility of EEE with 10GBASE 10GBASE-T", Solarfare Communication, Jul. 16, 2007, pp. 1-9.
Bennett et al., Minutes of Meeting held on Jan. 13, 2009, 7 pages.
Bennett et al., Minutes of Meeting held on Mar. 10, 2009, 5 pages.
Bennett et al., "Energy Efficient Ethernet Study Group Meeting Minutes", Jan. 22, 2008, 6 pages.
Bennett et al., "IEEE802.3az task force meeting", IEEE 802 Plenary, Orlando, FL, Mar. 18, 2008, 15 pages.
Bennett et al., Minutes of Meeting held on May 13, 2008, 8 pages.
Bennett et al., Minutes of Meeting held on Jul. 15, 2008, 6 pages.
Bennett et al., Minutes of Meeting held on Sep. 16, 2008, 5 pages.
Bennett et al., Minutes of Meeting held on Nov. 11, 2008, 5 pages.
Bennett, Mike, "IEEE 802.3az Energy Efficient Ethernet", Agenda and general information, Munich, Germany, May 2008, pp. 1-28.
Bennett, Mike, "IEEE 802.3 Energy Efficient Ethernet Study Group", Agenda and general information, San Francisco, California, Jul. 2007, pp. 1-31.
Barnette et al., "Speed Switching without Communication Interruption", VITESSE, Prepared for the IEEE 802.3 Study Group, pp. 1-15.
Barrass, Hugh, "EEE Backplane Architecture", IEEE 802.3az Eee Task Force, Vancouver, British Columbia, Mar. 2009, pp. 1-10.
Kasturia, "Next Steps for EEE Draft", Jan. 13, 2009, pp. 1-15.
Kasturia, "Next Steps for EEE Draft", Mar. 10, 2009, pp. 1-13.
Kasturia, "Generating the EEE Draft", 10 pages.
Kasturia, "Next steps for EEE Draft", Jul. 16, 2008, pp. 1-18.
Kasturia, "Next steps for EEE Draft", Nov. 11, 2008, pp. 1-14.
Klein, "802.1 AVB Power Management", Broadcom, IEEE Interim Meeting, Jan. 2009, pp. 1-15.
Koenen, "In support of EEE mode for 1000BASE-KX PHY", HP, IEEE 802.3az EEE Task Force, May 2008, pp. 1-8.
Koenen, "Conditions for Backplane PHY EEE Transitions", HP, IEEE 802.3az, Nov. 2007, pp. 1-10.

Koenen et al., "Towards consistent organization of LPI Functions, State Variables and State Diagrams", IEEE Energy Efficient Ethernet TF, Nov. 2008, pp. 1-9.
Koenen, "Backplane Ethernet Low-Power Idle Baseline Proposal", IEEE 802.3az EEE Task Force, Jul. 2008, pp. 1-14.
Law, "IEEE P802.3az Wait Time (Tw) From a System Design Perspective", IEEE P802.3az, IEEE Task Force, Version 3.0, pp. 1-18.
Law, "IEEE P802.3az Wake Time Shrinkage Ad Hoc report", IEEE P802.3az EEE Task Force, Version 5.0, Plenary week Meeting, Mar. 2009, pp. 1-13.
Law, "IEEE 802.3 Clause 30 Management, MIB, Registers and Function", IEEE P802.3az, Energy-efficient Ethernet Task Force, Plenary Week Meeting, Nov. 2007, pp. 1-13.
Law, "IEEE P802.3az Energy-Efficient Ethernet Architecture", IEEE P802.3az Eee Task Force, Version 2.0, Plenary week Meeting, Nov. 2008, pp. 1-20.
Law, "IEEE P802.3az Energy-efficient Ethernet and LLDP", IEEE P802.3az Eee Task Force, Version 1.1, Interim Meeting, May 2008, pp. 1-7.
Law, "IEEE P802.3az Asymmetric and Symmetric Modes", IEEE P802.3az EEE Task Force, Interim Meeting, Jan. 2009, Version 1.0, Jan. 2009, pp. 1-6.
Law, "Two TX Wait Timers in RS for 10GBASE-T Operation", IEEE P802.3az Eee Task Force, Version 1.0, Interim Meeting, Jan. 2009, pp. 1-4.
Kubo et al., "Hybrid LPI and Subset PHY Approach", IEEE 802.3az, NTT Access Network Service Systems Labs., NTT Corporation, Jul. 2008, pp. 1-10.
Louie et al., "Clause 73 Message p. 10", Broadcom, IEEE 802.3az Task Force, Jan. 2009, pp. 1-6.
Mcintosh, "Getting Stuck in UPDATE in the 1000BASE-T PHY Control State Machine", Vitesse Semiconductor Corp., IEEE 802.3az, Interim Meeting, Jan. 2009, pp. 1-8.
Nedevschi et al., "Reducing Network Energy Consumption via Sleeping and Rate-Adaptation", 12 pages.
Nicholl, "100GE and 40GE PCS Overview", IEEE 802.3az, Nov. 2008, pp. 1-27.
Nordman, "Musings on Savings", IEEE 802.3az Task Force Interim Meeting, Jan. 22, 2008, 8 pages.
Parnaby, "EEE Synchronization", Solarfare Communication, Jan. 14, 2009, pp. 1-5.
Parnaby, "10GBASE-T ad hoc output", Solarfare Communication, Sep. 16, 2008, pp. 1-10.
Parnaby, "10GBASE-T EEE Synchronization", Solarfare Communication, Nov. 11, 2008, pp. 1-16.
Parnaby, "Filling the 10GBASE-T TBDs: Wake & Sleep", Solarfare Communication, Sep. 15, 2008, pp. 1-6.
Parnaby, "10GBASE-T Parameter Values", 1 page.
Pillai et al., "Clause 49 State DiagramsClause Diagrams", Broadcom, IEEE 802.3az, Jan. 2009, 7 pages.
Pillai, "Enhanced EEE proposal for 10GBASE-KR", Broadcom, IEEE 802.3az, Mar. 2009, 8 pages.
Pillai et al., "KR, KX4 and KX LPI Parameters", Broadcom, IEEE 802.3az, Jan. 2009, 16 pages.
Pillai, "Values Needed for 10GBASE-Kr", Mar. 11, 2009, 3 pages.
Powell, "A "Subset PHY" Approach for Energy Efficient Ethernet", Broadcom, IEEE 802.3az EEE, Jan. 2008, 17 pages.
Powell, "Twisted Pair Subset PHYTwisted Phy", Broadcom, IEEE 802.3az EEE, Mar. 2008, 21 pages.
Powell, "A Gigabit "Subset PHYSubset Phy"Approach for 10GBASE for 10GBASE—T Energy Efficient Ethernet", Broadcom, IEEE 802.3az EEE, Nov. 2007, 11 pages.
Ratnasamy et al., "Reducing Network Energy Consumption Via Sleeping and Rate-Adaptation", pp. 1-29.
Sedarat, "10GBASE-T EEE Specifications Alert", Aquantia, Sep. 2008, pp. 1-7.

\* cited by examiner

| Message Count# | M 10 | M 9 | M 8 | M 7 | M 6 | M 5 | M 4 | M 3 | M 2 | M 1 | M 0 | Message Code Description |
|---|---|---|---|---|---|---|---|---|---|---|---|---|
| 10 | 0 | 0 | 0 | 0 | 0 | 0 | 0 | 1 | 0 | 1 | 0 | EEE Technology Message Code. EEE capability 2 unformatted next pages to follow. |

FIG. 8

| Bit | Bit definition |
|---|---|
| U10 | Next page - 1 |
| U9:U7 | Reserved, transmit as 0 |
| U6 | 10GBASE-KR EEE support (0 = no, 1 = yes) |
| U5 | 10GBASE-KX4 EEE support (0 = no, 1 = yes) |
| U4 | Reserved, transmit as 0 (for future 1000BASE-KX) |
| U3 | 10GBASE-T EEE support (0 = no, 1 = yes) |
| U2 | 1000BASE-T EEE support (0 = no, 1 = yes) |
| U1 | 100BASE-TX EEE support (0 = no, 1 = yes) |
| U0 | Reserved, transmit as 0 (for future 10BASE-T) |

FIG. 9

| Bit | Bit definition |
|---|---|
| U10 | Next page (to enable support of future technologies) |
| U9:U7 | Reserved, transmit as 0 |
| U6 | 10GBASE-KR PHY refresh cycle (0 = Reduced Energy, 1 = Lowest Energy) |
| U5 | 10GBASE-KX4 PHY refresh cycle (0 = Reduced Energy, 1 = Lowest Energy) |
| U4 | Reserved, transmit as 0 (for future 1000BASE-KX) |
| U3* | 10GBASE-T PHY refresh cycle (0 = Reduced Energy, 1 = Lowest Energy) |
| U2 | 1000BASE-T PHY refresh cycle (0 = Reduced Energy, 1 = Lowest Energy) |
| U1 | 100BASE-TX PHY refresh cycle (0 = Reduced Energy, 1 = Lowest Energy) |
| U0 | Reserved, transmit as 0 |

FIG. 10

| Bytes | Content | Value | Description |
|---|---|---|---|
| 6 | MAC DA | 01-80-C2-00-00-0E | LLDP_Multicast address |
| 6 | MAC SA | | MAC address of sending station or port |
| 2 | Ethertype | 88-CC | LLDP Ethertype |
| 9 | Chassis ID TLV | | Mandatory TLV (see 802.1AB) |
| 9 | Port ID TLV | | Mandatory TLV (see 802.1AB) |
| 4 | Time To Live TLV | | Mandatory TLV (see 802.1AB) |
| 2 | TLV type/Length | 127/8 | TLV Type and Length |
| 3 | OUI | 00-12-0F | 802.3 OUI |
| 1 | Subtype | | Energy Efficient Ethernet 802.3 subtype |
| 4 | System Wake Times | | System wake time advertisement |
| 1 | EEE PHY parameters | | PHY refresh duty-cycle parameters |
| 2 | End Of LLDPDU TLV | 00-00 | Mandatory TLV (see 802.1AB) |
| 14 | Padding + CRC | | |

FIG. 11

| Bit | Content | Value | Description |
|---|---|---|---|
| 31:16 | Transmit Tw_system capability | | System Wake Time, in microseconds, the system is capable of waiting before it must transmit data. For example, this could be a function of Tx system buffer depth. |
| 15:0 | Receive Tw_system request | | System Wake Time, in microseconds, the system is requesting it's link partner to hold off data transmission to enable the system to wake from the desired power-saving state. For example, this could be a function of system resume latency from the desired system power-saving states. |

FIG. 12

| Bit | Content | Value | Description |
|---|---|---|---|
| 7:1 | Reserved | 0x0 | Reserved |
| 0 | Refresh duty-cycle | | Quiet (Tq) & Refresh (Tr) time ratios for PHY power optimization<br>0 = "Reduced energy" duty cycle (Tq:Tr = n:1)<br>1 = "Lowest energy" duty cycle (Tq:Tr > n:1) |

FIG. 13

NEGOTIATING A TRANSMIT WAKE TIME

BACKGROUND

Many modern computer systems try to opportunistically reduce power consumption during periods of reduced activity. Common techniques include reducing or shutting down voltage power supply levels to one or more system components, stopping clocks, and so forth.

Different power consumption modes for computer systems have been dubbed $C_n$ (or alternately $S_n$ or $P_n$) states which indicate progressively greater power savings modes. The different modes often feature different wake latencies—the amount of time needed to resume a higher power mode. Thus, the choice of entering a particular power saving mode often requires a balancing between the amount of power savings and the amount of time needed to wake.

BRIEF DESCRIPTION OF THE DRAWINGS

FIGS. 8, 9, and 10 are diagrams of auto-negotiation messages.

FIGS. 11, 12, and 13 are diagrams of link layer discovery protocol frames.

DETAILED DESCRIPTION

In networking systems, a link connects and permits communication between two link partners. Data transmission between link partners can vary from large bursts of data to periods where no data needs to be transmitted at all. The absence of data transmission permits components in both link partners to enter low power modes. For example, the transmit circuitry in one link partner and the receive circuitry in the other link partner can both enter a low power mode. A low power mode may apply only to networking components. For example, the low power mode may strictly apply to a PHY, a component that handles physical transmission of data signals over a link. However, a low power mode may also potentially extend to other system components. For instance, when a server anticipates a lower volume of network traffic, the server can power down one or more processor cores and other system components (e.g., spinning down disks and so forth). As described above, a longer sleep duration can permit a system to enter a deeper power saving mode, though often at the expense of an increased wake latency. Thus, the larger the amount of time a system is given to wake, the more power that can be saved.

As described below, to potentially increase the continuous "quiet" duration available and thus enable the system to enter into a deeper power saving mode, a link partner can "borrow" time from its remote link partner by requesting a guarantee that the remote partner wait an amount of time (Tw system) after initially sending wake symbols to begin data transmission. For example, a transmitting link partner can buffer data in a transmit buffer to delay transmitting data to a link partner while the link partner wakes. The transmitting link partner may also use other ways to delay transmission, for example, by sending flow control messages to upstream nodes. The receive partner can use this known delay to enter a deeper power saving state that requires a longer wake-time and possibly postpone wake-up operations without suffering loss of data between the link partners. The amount of time a transmitter commits to providing to a receiver is a Tw system (a system transmit wake) value negotiated by the transmitter and receiver. A receiver can potentially add the Tw system time of its link partner to time provided, for example, by its own receive buffers, permitting an even larger time window to wake to further reduce system power consumption.

Figure 1:
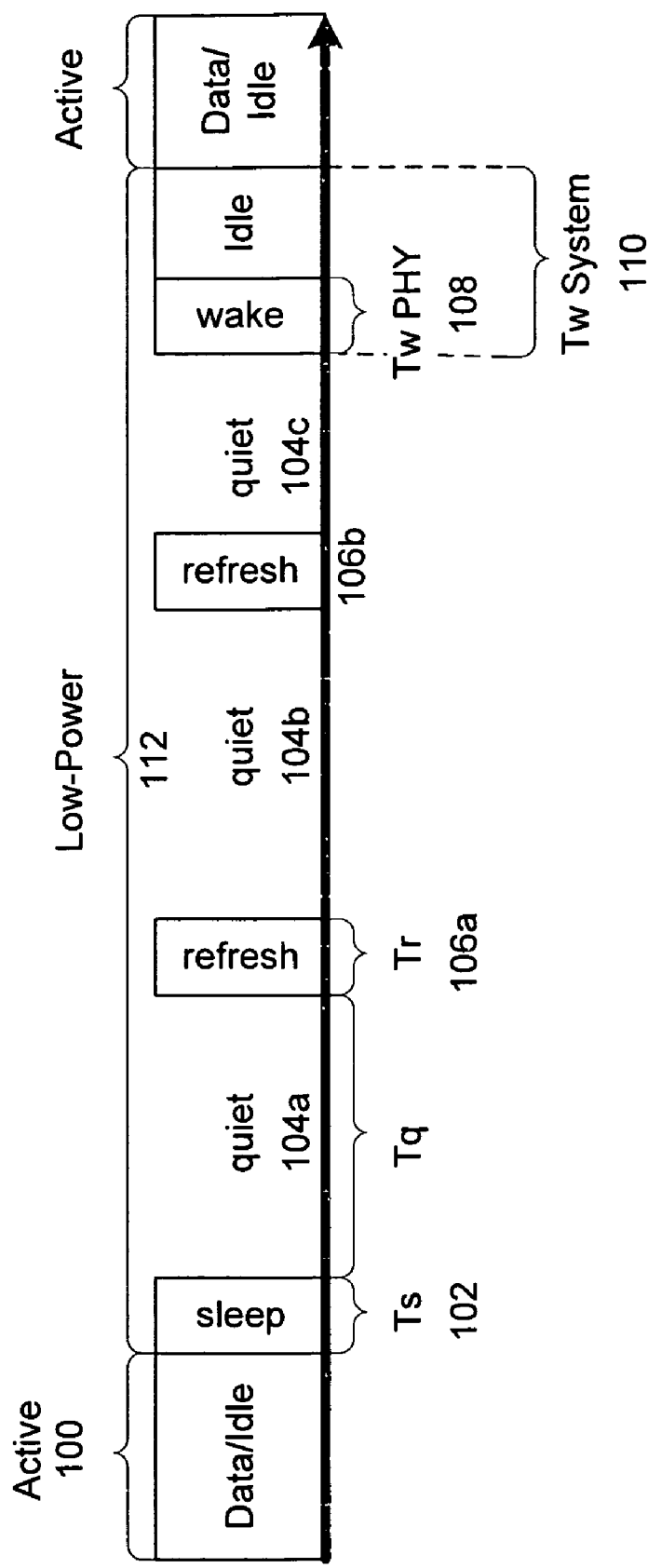
FIG. 1 is a timeline of transmissions by a link partner.

In greater detail, FIG. 1 depicts operation of a transmitting link partner over time. As shown, the link partner is initially active 100, transmitting data or idle symbols. When a temporary halt in transmission is foreseen (e.g., a transmit buffer is empty or falls below some threshold or the transmitting node itself is not receiving data), the transmitting link partner sends sleep symbols to its partner for a duration Ts 102. The transmitting link partner can then enter a reduced power mode 112. During this time, quiet periods (Tq 104a-104b) are periodically interrupted by brief refresh periods, Tr, 106a-106b where the link partners perform timing recovery and coefficient synchronization.

After determining transmission is to resume, the transmitting link partner wakes its PHY to an active mode. This takes an amount of time Tw PHY 108. Even after Tw PHY 108, however, the transmitting link partner continues to delay transmission of data until time Tw system 110 has elapsed, giving the receiver an additional Tw system 110 amount of time to wake beyond the initial transmission of wake symbols.

The Tw system 110 value may be derived in a variety of ways. For example, a receiver may request a desired amount of time, Tw Rx, before data transmissions resume. The receiver may determine the value of Tw Rx based on a variety of factors such as system performance requirements, system wake time, the size of a receive buffer to store data, the time needed to wake the receiver PHY, and/or on the power saving mode sought.

A transmitter may likewise determine an amount of time, Tw Tx, that the transmitter offers to delay data transmission after transmission of wake symbols. Again, the Tw Tx value may be based on a variety of factors such as the Tw PHY value of the transmitter and/or the amount of a transmit buffer available to the link.

The Tw system value, the negotiated amount of time a transmitter commits to delaying transmission, can be resolved to the lesser of the transmitters Tw Tx value and the receivers Tw Rx value. This ensures that both link partners can support the negotiated Tw system value.

Typically, a link supports a duplex connection between partners. That is, both partners send and receive data. Thus, the different directions of a link may be characterized by different Tw system values and each partner may have its own Tw Tx and Tw Rx values. The negotiation of the Tw system values may feature an exchange of the Tw Tx and Tw Rx values between the partners.

Figure 2:
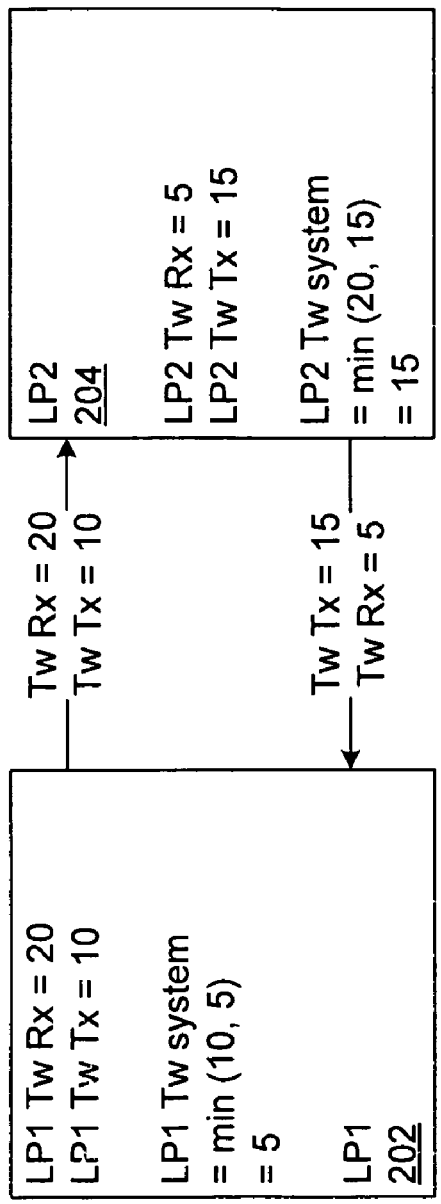
FIG. 2 is a diagram illustrating resolution of transmit wake times by link partners.

FIG. 2 illustrates a sample negotiation between link partners LP1 and LP2. As shown, link partner LP1 has a Tw Rx (LP1) value of 20 ms and a Tw $Tx_{(LP1)}$ value of 10 ms. In other words, link partner LP1 is requesting a delay of transmission from partner 204 of 20 ms and offers a 10 ms delay of transmission to partner LP2. Similarly, link partner LP2 has a Tw $Tx_{(LP2)}$ value of 15 ms and a Tw Rx (LP2) value of 5 ms.

After exchange of these values between partners, both partners can determine the Tw system$_{(LP1)}$ and Tw system$_{(LP2)}$ values. In the example shown, the exchanged values yield a Tw system$_{(LP1)}$ value of 5 ms for transmission from partner LP1 to partner LP2. In other words, while partner LP1 offered a 10 ms delay, LP2 only requested a 5 ms delay. Likewise, the Tw system$_{(LP2)}$ value resolves to a Tw system$_{(LP2)}$ value of 15 ms—the lesser of the 20 ms delay requested by partner LP1 and the 15 ms delay offered by partner LP2.

While FIG. 2 illustrates a single negotiation, the negotiation may be performed any number of times based on system performance or energy savings priorities. For example, partner LP2, after having received Tw Tx$_{(LP1)}$ may determine a deeper sleep mode may be possible and initiate a renegotiation with a larger Tw Rx$_{(LP2)}$ value. Additionally, the Tw Rx and Tw Tx values of a link partner may change over time. For example, as fewer buffers may be allocated to a particular link, a partner may offer a smaller Tw Tx value. Likewise, a partner may determine a deeper power reduction mode is not possible due to other network traffic or system load and reduce its request (e.g., a smaller Tw Rx value). Additionally, the possible values of Tw system may be bounded by defined Tw system min and max values. Typically Tw min would be determined by the resume capabilities of the physical layer transceiver (PHY) being used.

Figure 3:
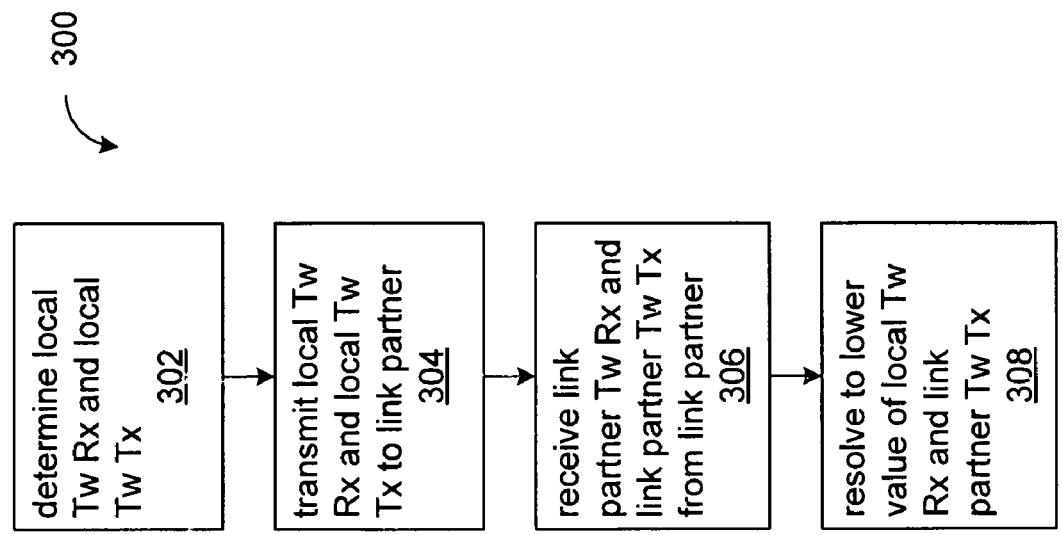
FIG. 3 is a flow-chart of a process to determine a transmit wake time.

FIG. 3 depicts a sample negotiation flow 300 of a local link partner. As shown, after determining local Tw Tx and Tw Rx values 302, these values are transmitted to a remote link partner 304. Before or after this transmission, the Tw Tx and Tw Rx values of the remote link partner are received 306. The egress Tw system value of the link partner is resolved 308 to the lower of the local Tw Tx value and the remote Tw Rx value. In the absence of an exchange of the Tw values, the Tw system value may default to a specified Tw min value.

Figure 4:
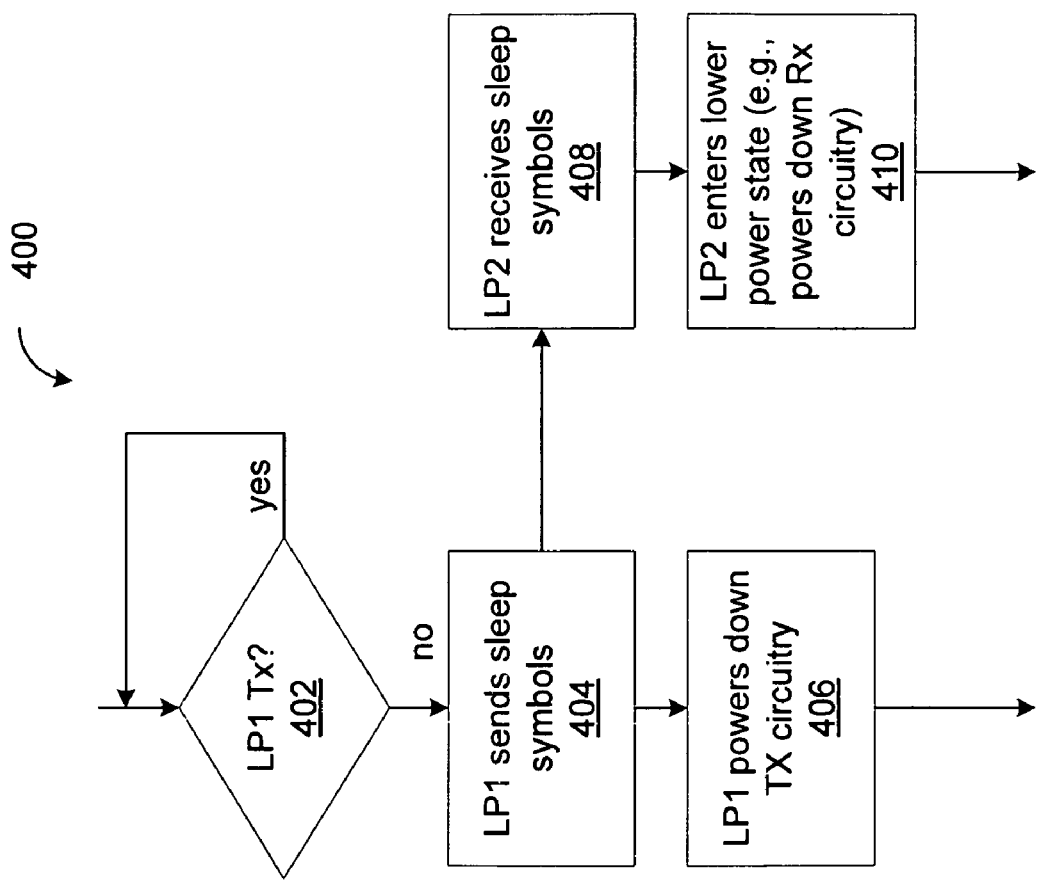
FIG. 4 is a flow-chart of a process to enable a link partner to power down.
Figure 5:
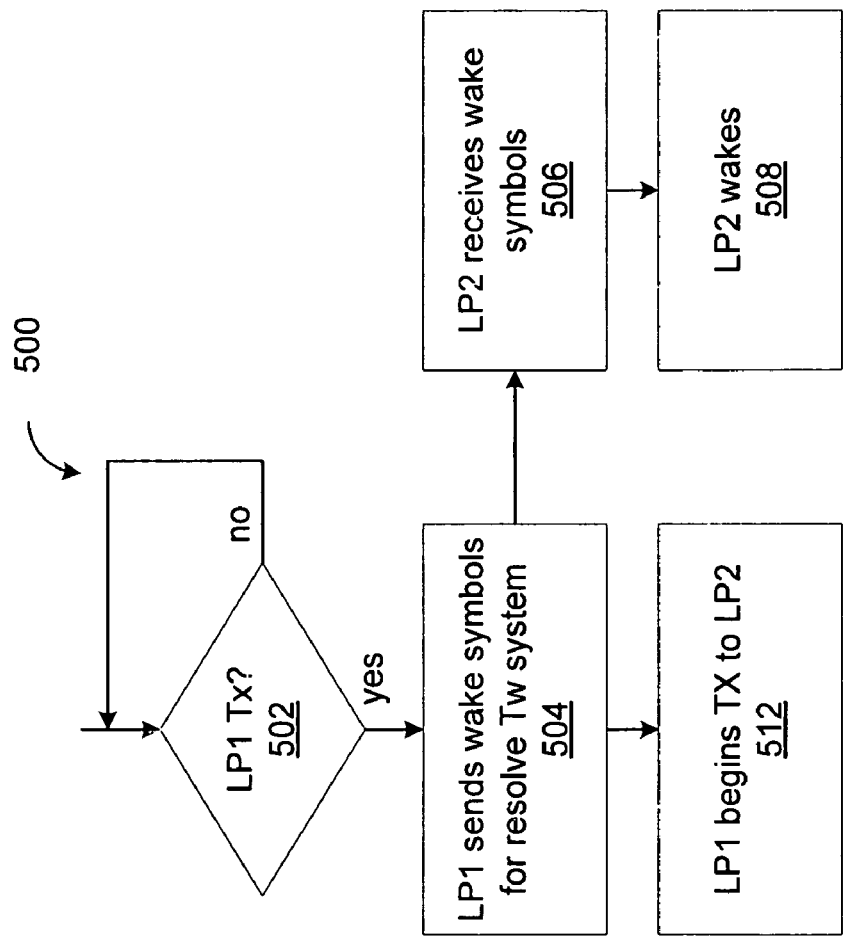
FIG. 5 is a flow-chart of a process to resume data transmission to a link partner.

FIGS. 4 and 5 depict sample operation 400 after the negotiation. As shown in FIG. 4, when LP1 determines 402 transmissions to LP2 may be temporarily suspended, LP1 sends sleep symbols 404 to LP2. Thereafter, LP1 powers down 406 its transmission circuitry. When LP2 receives the sleep symbols 408, LP2 also enters a lower power state, for example, by powering down receive circuitry 410.

As shown in FIG. 5, when LP1 determines 502 transmission to LP2 will shortly resume, LP1 sends 504 wake symbols to LP2. After receipt 506, LP2 wakes 508, for example, fully powering the LP2 PHY receive circuitry. LP1 delays data transfer to LP2 (e.g., buffers Tx data) after initial transmission of the wake symbols for, at least, the negotiated Tw system time period for the egress link of LP1. Thereafter, LP1 transfers the data buffered during the Tw system period and operation returns to normal.

The techniques described above may also be used when a link has a low bandwidth utilization rate compared to the maximum data throughput capabilities of the link. For example, when data destined for LP2 is arriving at a very slow rate with respect to the size of the transmitter Tx buffer, LP1 can send sleep symbols and enable LP2 to enter a low power mode while the Tx buffer of LP1 slowly accumulates data. When stored data in LP1's Tx buffer exceeds some watermark threshold that still permits an egress Tw system transmission delay, LP1 can send wake symbols.

Figure 6:
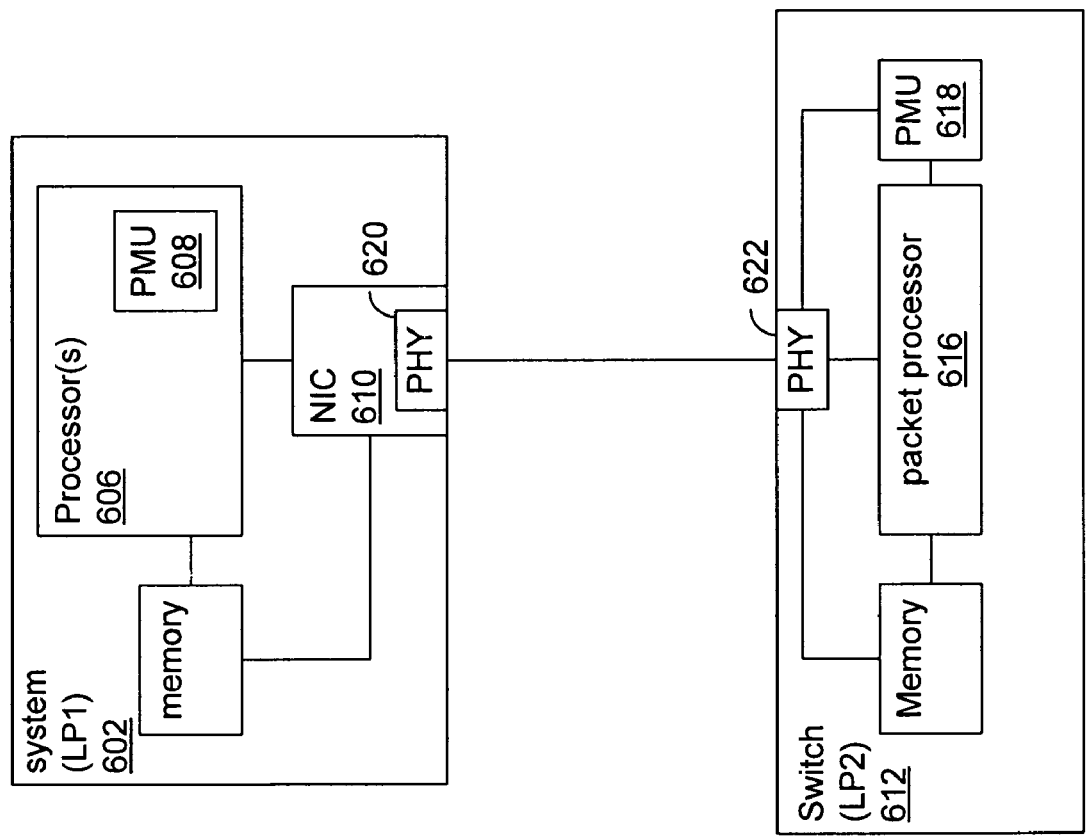
FIG. 6 is a diagram illustrating link partners.

FIG. 6 illustrates sample architecture of link partners LP1 602 and LP2 612. In this example, LP1 is a host computer system having a one or more processors 606. For example, the processors may be programmable cores integrated on the same die or within the same package. The system 602 includes a network interface controller (NIC) 610. The NIC 610 may be an integral part of the system (e.g., integrated within a motherboard or the same die as the processor(s)) or an attached unit (e.g., a NIC card).

Also shown in FIG. 6 is a power management unit 608. The power management unit 608 includes circuitry to control power usage by system components. For example, the power management unit 608 may initiate one of several different sets of varying power usage modes (e.g., Cn, Sn, or Pn sleep modes) where increasing values of n correspond to deeper power saving modes. The power management unit 608 may also control power provided to other components (e.g., processor, chipset, accelerators, I/O systems, mass storage devices, and so forth). For example, the power management unit 608 may interact with the NIC 610 and/or NIC PHY 620 to control power usage. For example, the power management unit 608 may access Tw PHY data from the PHY (e.g., stored in a PHY register accessible to external components) to determine a local Tw Rx value. The power management unit 608 may also sent data to the PHY 620 indicating a desired Tx Rx based on the amount of wake time needed for a particular power saving mode selected from a set of power saving modes (e.g., $C_n$ or $P_n$).

The power management unit 608 may implement different policies to determine a target power saving mode/Tx Rx. For example, a power management unit 608 for a battery powered mobile system or laptop may attempt to negotiate sufficient time to enter a more aggressive power savings mode than a continually powered desktop system. The power management unit 608 may also take into account thermal considerations. For example, an extended power saving period permits a greater amount of thermal dissipation which may be particularly advantageous in compact mobile devices. In the event negotiation of a Tw system value does not permit entry into a desired power saving mode, the power management unit can select a power saving mode that requires a smaller wake latency and attempt renegotiation with a smaller Tw Rx value.

The power management unit 608 may initiate power savings based, at least in part, on the negotiated ingress Tw system value. The power management unit 608 may also select a power saving mode based on other factors such as requirements of executing applications, the systems receive buffer size, and so forth. After receiving sleep messages, the power management unit 608 may be notified of the current Tw system value. Alternately, the value may have been communicated previously (e.g., whenever negotiated) and the power management unit 608 is informed only of the arrival of sleep messages. Thereafter, the power management unit 608 can initiate entry into a selected power mode, again, based at least in part, on the ingress Tw system value (e.g., a higher Tw system value results in a deeper power saving mode). After the power management unit 608 is notified of receipt of wake messages, the power management unit 608 can initiate waking of system components to enter a different selected power mode.

As shown, LP1 602 shares a link with switch LP2 612. The link may be a cabled, electrical backplane, wireless, or optical link, in turn, requiring the appropriate physical transceiver (PHY) circuitry.

The switch 612 connects to the link via PHY 622. As shown, the switch 612 features packet processing circuitry 616 such as an ASIC (Application Specific Integrated Circuitry) or Network Processor to perform switching operations such as forwarding lookups, etc. The switch 612 may also feature a power management unit 618 that operates as described above, for example, by interacting with the PHY 622 to access Tw PHY and determine Tw Tx or set Tw Rx based on switch 612 wake latencies. The power management unit 618 may also coordinate power consumption of switch 612 components based, at least in part, on a negotiated ingress Tw system value. For example, the power management unit 618 may enter different power modes based on receipt of sleep or wake symbols from LP1 602.

Though FIG. 6 illustrated link partners as a host computer system 602 and a switch 612, the operations described above may be implemented by other devices. For example, the link partners may be blades or line cards interconnected by a backplane. Additionally, though LP1 and LP2 are depicted as featuring a single link, either system may feature multiple links and negotiate respective Tw system values for each as described above. Further, while FIG. 6 depicts a discrete power management unit 608, the power management operations described above may be implemented in other circuitry.

Figure 7:
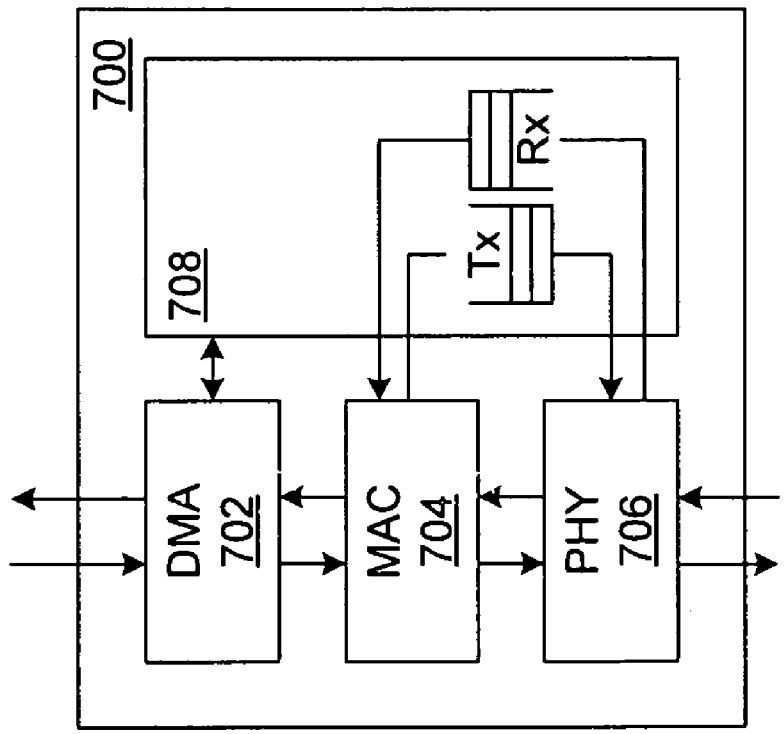
FIG. 7 is a diagram of a network interface controller.

FIG. 7 illustrates a sample NIC 700 in greater detail. As shown, the NIC 700 features a PHY 706 to perform physical signaling, a media access controller (MAC) 704, for example, to perform framing operations, and a direct memory access (DMA) engine to transfer packets between host memory and the NIC 700. The MAC 704 and PHY communicate via an egress Tx queue and ingress Rx queue in memory 708. The PHY 706 may feature one or more externally accessible registers to store Tx PHY and/or Tx Rx values.

Circuitry to perform the Tw system negotiation described above may be located in a variety of places within NIC 700. For example, the negotiation may be performed by physical coding sublayer (PCS) circuitry within the PHY 706. Alternately, the circuitry may be located within MAC 704. In other implementations, the circuitry may be implemented outside of the NIC 700, for example, in a power management unit or by driver software executed by a processor.

NIC architectures vary considerably from the one illustrated in FIG. 7. For example, some feature multiple instances of one or more of the components (e.g., multiple DMA engines, or multiple MACs and PHYs). Additionally, other NIC architectures feature offload circuitry (e.g., a TCP/IP [Transmission Control Protocol/Internet Protocol] offload engine or a CRC [Cyclic Redundancy Check] engine).

FIGS. 8-13 are diagrams of messages of messages that can be used to perform operations described above. More specifically, FIGS. 8-10 depict initial Ethernet PHY autonegotiation while FIGS. 11-13 depict LLDP (Link Layer Discovery Protocol) messages that can be used to exchange Tw values.

In greater detail, during initial auto-negotiation, a PHY can transmit a Fast Link Pulse identifying its capabilities. A fast link pulse may include, for example, 33-time slots with even slots carrying message data pulses. Each set of pulses is known as a page. As shown in FIG. 8 after an initial page carrying a technology ability field (TAF), a subsequent page may include a value of 0x0A to identify Energy Efficient Ethernet (EEE) capabilities. FIG. 9 depicts a subsequent page that identifies whether EEE is supported for different technologies. A further page, shown in FIG. 10, can identify a ratio between a PHYs Tq and Tr. The higher the ratio, the greater the opportunity for energy savings. For example, a "reduced energy" refresh duty cycle value (e.g., 0) may feature a Tq:Tr ratio of n:1 while a "lowest energy" refresh value (e.g., 1) may feature a greater Tq:Tr ratio. The link PHYs can advertise the refresh duty cycle values and resolve to the lower of the values.

As shown in FIG. 11, link layer discovery protocol (LLDP) messages may be used to exchange data between link partners. Briefly, LLDP (e.g., IEEE (Institute of Electrical and Electronic Engineers) 802.1AB) defines a set of type-length-value (TLV) fields used to identify the values of different types of data. As shown, in addition to fields required by LLDP, an LLDP message can include System Wake Times and EEE PHY parameters. As shown in FIG. 12, the system wake timers can include the Tw Tx and Tw Rx values for a link partner. That is, each link partner may send an LLDP message as shown in FIGS. 11 and 12 to exchange Tw values. As shown in FIG. 13, the EEE PHY parameters can include the refresh cycle value instead of, or in addition to, being communicated in the autonegotiation process.

The message formats shown in FIG. 8-13 are merely examples. For example, the data may be stored in different fast link pulse time slots or in different LLDP fields. Additionally, a wide variety of other techniques for communicating the Tw and/or PHY values may be used. For example, instead of, or in addition to, LLDP messages, Tw and PHY values may be exchanged via MCF (Mac Control Frames). Additionally, other information may be exchanged. For example, link partners may exchange their Tw PHY values as part of the negotiation to provide greater information to a link partner. This can facilitate a renegotiation based on the Tw PHY value (e.g., a system cannot offer a Tw system value less than Tw PHY).

The term circuitry as used herein includes hardwired circuitry, digital circuitry, analog circuitry, programmable circuitry, and so forth. The programmable circuitry may operate on computer program instructions stored on tangible computer readable storage mediums.

Other embodiments are within the scope of the following claims.

What is claimed is:

1. A method, comprising:
receiving, from a link partner, a message specifying a link partner receive wake time;
resolving to the lesser of the received link partner receive wake time and a local transmit wake time;
after sending a wake message to the link partner, delaying transmission of data destined for the link partner for at least the lesser of the link partner receive wake time and a local transmit wake time;
resuming transmission of data to the link partner after the lesser of the link partner receive wake time and a local transmit wake time.

2. The method of claim 1,
further comprising determining the local transmit wake time based on an amount of buffer to store data destined for the remote link partner; and
wherein delaying transmission comprises buffering data destined for the remote link buffer.

3. The method of claim 1,
wherein the message further specifies a link partner transmit wake time; and
further comprising determining a local receive wake time based, at least in part, on the wake time of a PHY.

4. The method of claim 3, wherein the determining the local receive wake time comprises determining based on a wake requirement of a one of a set of multiple power reduction modes.

5. The method of claim 1,
further comprising transmitting a frame to the link partner, the frame comprising a local transmit wake time and a local receive wake time.

6. The method of claim 1,
wherein the message comprises a link layer discovery protocol frame.

7. The method of claim 1,
further comprising transmitting an indication of a quiet/refresh ratio in an even numbered time slot of a link pulse.

8. The method of claim 1, wherein the receiving, the resolving, and the buffering comprises receiving, resolving, and buffering at a network interface controller, the network interface controller comprising a PHY, a media access controller, and a direct memory access (DMA) engine.

9. The method of claim 1, wherein the message further comprises a wake time for a PHY.

10. A system, comprising:
a network interface controller, the network interface controller comprising:
  a PHY;
  a media access controller;
  a direct memory access engine; and
  circuitry to
    receive, from a link partner, a message specifying a link partner receive wake time;
    resolving to the lesser of the received link partner receive wake time and a local transmit wake time;
    delay transmission of data destined for the link partner for at least the lesser of the link partner receive wake time and a local transmit wake time;
    resume transmission of the buffered data to the link partner after the lesser of the link partner receive wake time and a local transmit wake time.

11. The system of claim 10,
further comprising circuitry to store a local transmit wake time.

12. The system of claim 10,
wherein the PHY comprises circuitry to store a PHY transmit wait time.

13. The system of claim 10,
wherein the message further specifies a link partner transmit wake time.

14. The system of claim 10, wherein the determining the local receive wake time comprises determining based on requirements of one of a set multiple power reduction modes.

15. The system of claim 10,
further comprising circuitry to transmit a message to the link partner, the message comprising a local transmit wake time and a local receive wake time.

16. The system of claim 10,
wherein the message comprises a link layer discovery protocol frame.

17. The system of claim 10,
further comprising circuitry to transmit an indication of a quiet/refresh ratio of the PHY in an even numbered time slot of a link pulse.

18. The system of claim 10,
further comprising:
  memory;
  a processor; and
  a power management unit, the power management unit to indicate to the network interface controller a wake period associated with a selected one of multiple power reduction modes.

19. The system of claim 18, wherein the power management unit enters a selected one of multiple power reduction modes based on the lesser of the received link partner receive wake time and a local transmit wake time.

20. A method, comprising:
receiving, from a link partner, a message specifying a link partner transmit wake time;
resolving to the lesser of the received link partner transmit wake time and a local receive wake time;
after receiving a sleep message from the link partner, entering a system power saving mode based, at least in part, on the resolved lesser of the received link partner transmit wake time and a local receive wake time;
after receiving a wake message from the link partner, exiting the system power saving mode; and
receiving data from the link partner only after the resolved lesser of the link partner transmit wake time and a local receive wake time.

21. The method of claim 20,
further comprising notifying a system power management unit of the resolved lesser of the received link partner transmit wake time and a local receive wake time.

22. The method of claim 21,
wherein notifying the system power management unit comprises notifying after receiving the sleep message.

* * * * *